Patented Apr. 14, 1925.

1,533,778

UNITED STATES PATENT OFFICE.

WILLIAM H. WALKER, OF BRIDGTON, MAINE, ASSIGNOR, BY MESNE ASSIGNMENTS, TO ELLIOTT COMPANY, OF PITTSBURGH, PENNSYLVANIA, A CORPORATION OF PENNSYLVANIA.

METHOD AND MEANS FOR PURIFYING WATER.

No Drawing. Application filed September 27, 1920. Serial No. 413,107.

*To all whom it may concern:*

Be it known that I, WILLIAM H. WALKER, a citizen of the United States, and resident of Bridgton, in the county of Cumberland and State of Maine, have invented certain new and useful Improvements in Methods and Means for Purifying Water, of which the following is a specification.

This invention relates to the art of purifying water for industrial or domestic purposes, and more particularly to removing the very finely divided particles of the hydrates of iron together with the very fine floating material present in water in what is usually termed the colloidal condition.

The removal of such colloidal material by filtration is extremely difficult, owing to the fact that none of the ordinary, commercial filtering mediums has pores sufficiently fine to refuse the passage of the colloidal particle. It has been common practice, however, for many years to prepare such types of water for filtration by adding a material which precipitates with the material or particles in a flocculent, more or less gelatinous mass, and which in so doing entangles or entrains the floating fine particles, thus making other particles of a size and character which adhere to and are removed by the filtering medium. Filtration is rendered more complete also by adding a substance to the water which will break or destroy the colloidal condition, causing the individual particles to agglomerate into units of such size as can be removed by filtration.

One common method for bringing about this result is to add to the water before filtration a small quantity of alum (aluminum sulphate) or copperas (iron sulphate) which reacts with the alkali usually present in normal waters, producing two effects thereby. First, the colloidal condition of any material present is more or less destroyed; and, second, the alum or iron, as the case may be, is precipitated by the alkali in the form of flocculent, gelatinous aluminum hydroxide. If there be not present in the water sufficient alkali to bring about this reaction, enough is added in the form of soda ash, or equivalent material, to effect this precipitation. The flocculent precipitate thus formed entangles and collects the fine particles of floating matter in the water, making subsequent separation, either by decantation or filtration, possible.

If sufficient time is allowed, this floating, flocculent mass will settle to the bottom, drawing down with it the very finely divided particles, and thus leave a clear, usable, supernatant liquid; or by passing the same through a bed of sand or other filtering material, the flocculent material adheres to the grains of sand and a filtering medium is quickly built up which allows only clear water to pass, and thus a satisfactory effluent is produced.

In order that this reaction may be brought about with the least expenditure of alum or other chemical material, it is obvious that the chemicals must be added to the water in the proper proportion and that as the flow of water through the system varies, the addition of the chemicals must change in proportion to the volume passing. This regulation is difficult to control and introduces many hardships in the automatic operation of such filters, especially where there are wide and rapid fluctuations in the rate of flow.

In certain cases where the dissolved oxygen of the water has been removed by exposing the heated water to rapidly corroding iron sheets, this deoxygenated water carries iron hydroxide to a very large extent in this extremely fine state of subdivision previously spoken of as colloidal. Experiments have shown that the most efficient coagulating or precipitating agents are hydroxyl ions, the characteristic ions of caustic soda or other alkaline materials in aqueous solution, or hydrogen ions, which occur in all acid solutions. I have found that these ions are much more efficient as precipitation agents than the ions in alum, copperas, or any other salts of the many which have been tried out to destroy this colloidal condition, and enable the particles to mass together or flocculate. To effect this change, the addition of either an acid forming or an alkali forming material must be made with great care, and frequently the coagulum thus produced is not of such physical property as to enable it to adhere to the sand or other filtering material for its complete removal. An excess of either ion is also undesirable, especially of hydrogen ions, because the metallic hydroxids tend to dissolve in the acid solutions.

If the iron thus coagulated and the other floating material which is frequently present in water does not readily adhere to the particles of sand or to the structure of the medium employed, it passes through the filter practically unchanged. This is more especially the case when the sand is clean and bright, which is the condition after the filter has been washed. Only when the grains of sand become coated with the iron slime does the filter as a whole function satisfactorily. The separation is effected more by the flocculent particles impinging upon and clinging to the individual grains of sand already covered with the slime than to the inability of the particles to pass through the interstices of the filter. As this material collects upon the sand, however, the pressure necessary to force the water through the filter increases and there comes a time when the accumulated mass must be removed from the surface of the sand by rapid flow of water in a reverse direction, the sand particles rolling over each other free themselves to a very large extent of the deposited material. Before this filter again functions properly, however, the sand particles must again become coated with the iron or alum slime and while this operation is proceeding, much floating material passes through the filter with its consequent unsatisfactory performance.

I have discovered that the function of adding a regulated amount of alkali to the water sufficient to precipitate the colloidal ferric hydroxids or other material which may be present in the water and at the same time furnishing a structure on which the precipitated slime may collect and act as a filtering medium, may be combined if granulated or crushed calcined magnesium carbonate (magnesite) be placed in the filter preferably in a layer on the perforated bottom or top of the filter.

When magnesite, which is magnesium carbonate, is heated it is changed to magnesium oxide, which upon exposure to water changes slowly to magnesium hydroxide. The solubility of this magnesium hydroxide is very small, but is sufficient to introduce just the proper amount of hydroxyl ions for the precipitation action already described. The coagulation of the colloidal materials contained in the water is thus brought about near or on the surface of the grains of calcined magnesite and a filtering medium of great efficiency is almost immediately built up, as compared with the much slower building up action on an ordinary sand filter. Furthermore, as the grains of calcined magnesite become covered with the coagulum of iron hydroxide, the rate of solution decreases so that there is not thrown into the water an excess of alkali over that needed to completely precipitate the iron and other floating material. The result is, therefore, that alkali is thrown into the water so long as it is needed and upon the formation of a sufficiently active filtering medium the solubility is automatically reduced and excess of alkali thus avoided. Furthermore, if the water coming to the filter should by any chance be already alkaline, the solubility of the magnesite would be repressed just when it was not needed, whereas, if the water were acid, the magnesite would dissolve very rapidly until the proper alkalinity were built up.

In carrying out my invention I prefer to employ as a container or vessel provided with a perforated bottom for the filtering medium, or many of the well known forms of pressure filter now on the market may be used. Magnesite of good commercial quality is calcined at a temperature of approximately 700 degress centrigrade. It is a well known fact that if heated below this temperature the evolution of the carbondioxide gas is slow and tedious while at a high temperature, if the magnesite is not of very high purity, it becomes "dead burnt" and therefore only partially soluble.

After calcining, the magnesium oxide thus formed is crushed so that it all passes a one-fourth inch mesh sieve and that which is refused by a one-tenth inch mesh sieve is collected. Other sieves will, of course, function in the above described manner, but I have found this sieve to work well. In addition to its coagulating action, this material has the property of catching and holding on its surface the flocculent coagulum thus produced. This appears to be due to the fact that the concentration of hydroxyl ions is greatest just at the surface of the magnesite grains. Whatever the explanation, the effect of the presence of this crushed, calcined magnesite is that the colloidal condition of particles of matter in the water is quickly and completely destroyed, the filtering medium of the coagulum deposited upon the solid structure becomes rapidly effective, and the entire operation proceeds with speed and completeness.

When the precipitated coagulum collects upon the particles of magnesite, or magnesite mixed with sand or other body material of this nature which may be used, the resistance to flow increases and the loss in pressure occasioned by passing through the filter is also increased. From time to time, therefore, it is necessary to force water therethrough in a reverse direction in order that the accumulated mass may be removed from the surface of the grains and discarded from the filter, which is done in a way well understood by those skilled in the art. The advantage of the presence of the particles of magnesite, however, is that the reformation of the structure in such a way that filtration is practically complete, is very much more rapid in the presence of the grains of magnesite than is the case when the filter bed is made of quartz or other material alone.

It is possible that other mechanical devices than the one described under the general term of pressure filter may be used or which will accommodate themselves to this method of water purification and it is to be understood that this invention is not limited to the use of any particular mechanical device or filter and that many apparently widely different embodiments of my invention may be designed or arranged without departing from the spirit thereof or the scope of the appended claims. I intend that all matter contained in the foregoing description shall be interpreted as illustrative merely of an operative embodiment of my invention and not in a limiting sense.

What I claim is:—

1. The method of purifying water which consists in the addition thereto of calcined magnesite to cause a coagulation and precipitation of the colloidal particles therein and simultaneously to form a filtering medium adapted to remove said colloidal particles from the water.

2. The method of purifying water which consists in coagulating the finely divided and colloidal particles previous to filtration by the addition thereto of crushed calcined magnesite.

3. The method of purifying water which consists in coagulating the colloidal iron hydroxide therein previous to filtration by the addition thereto of crushed calcined magnesite.

4. The method of purifying water which consists in coagulating and removing finely divided and colloidal ferric hydroxide and other colloidal material from the water by passing the water through a layer of crushed calcined magnesite.

5. The process of removing finely divided colloidal suspended matter from water which consists in adding thereto calcined magnesite and subsequently passing the water through a filtering medium.

6. The process of removing finely divided colloidal suspended matter from water which consists in passing the water through a layer of calcined magnesite and subsequently passing said water through a filtering medium.

7. A filtering medium adapted for the removal from water of finely divided or colloidal material, embodying particles of calcined magnesite adapted to coagulate said colloidal material and upon which the coagulum will adhere and form thereby a medium of low resistance and high filtering power.

Signed at New York city in the county of New York and State of New York this 23rd day of September A. D. 1920.

WILLIAM H. WALKER.